United States Patent [19]

Fischer et al.

[11] Patent Number: 5,287,436
[45] Date of Patent: Feb. 15, 1994

[54] POLYGON SORT ENGINE

[75] Inventors: Douglas A. Fischer; Bradley D. Peterson; Keith L. Jackson, all of Albuquerque, N. Mex.; Glenn M. Courtright, Clay, N.Y.

[73] Assignee: Honeywell Inc., Minneapolis, Minn.

[21] Appl. No.: 979,348

[22] Filed: Nov. 20, 1992

Related U.S. Application Data

[63] Continuation of Ser. No. 514,723, Apr. 26, 1990, abandoned.

[51] Int. Cl.[5] ............................................ G06F 15/72
[52] U.S. Cl. .................................. 395/119; 395/133; 395/141; 395/162; 395/164
[58] Field of Search ............... 395/119, 121, 133, 141, 395/162, 164; 340/798, 799

[56] References Cited

U.S. PATENT DOCUMENTS

3,621,214  11/1971  Romney et al. ..................... 395/121
4,930,091   5/1990  Schroeder et al. .................. 395/121
5,020,002   5/1991  Malachowsky ................. 395/133 X

Primary Examiner—Mark K. Zimmerman
Attorney, Agent, or Firm—Ronald E. Champion

[57] ABSTRACT

A polygon sort engine including first and second apparatus for sorting. The first apparatus for sorting receives planar, externally convex polygon vertices from an external polygon tiling engine. This includes points and lines. The state machine on the second apparatus for sorting interfaces with the polygon tiling engine and a raster engine in a graphics pipeline. It provides a control signal which determines when the first apparatus for sorting will receive the next polygon. The second sorting appartus also controls whether the polygon is stored in the PING or PONG memory. For example, as the state machine is controlling the sorting of the current polygon into the PING RAM, the state machine will also be controlling the loading of the previous vertices and the PONG RAM into the raster engine.

3 Claims, 11 Drawing Sheets

POLYGON SORT ENGINE

This is a continuation of copending application Ser. No. 07/514,723, filed on Apr. 26, 1990, abandoned.

FIELD OF THE INVENTION

The present invention is directed generally to computer generated graphic display systems and, more particularly, to an apparatus for receiving a list of polygon vertex points, sorting the list and generating two sets of edges for each polygon which are output to the next stage of a graphics pipeline.

RELATED APPLICATIONS

The following applications are included herein by reference:

(1) assignee's copending application, Ser. No. 07/192,798, DIGITAL MAP SYSTEM, filed May 11, 1988 now U.S. Pat. No. 4,876,651, issued Oct. 24, 1989;

(2) assignee's copending application, U.S. patent application Ser. No. 07/514,685 filed on Apr. 26, 1990 entitled HIGH SPEED PROCESSOR FOR DIGITAL SIGNAL PROCESSING;

(3) assignee's copending application, Ser. No. 203,660, GENERATOR WITH VARIABLE SCAN PATTERNS, filed Jun. 7, 1988 now U.S. Pat. No. 4,844,220, issued Nov. 28, 1989;

(4) assignee's copending application, Ser. No. 07/261,109, A METHOD OF STORAGE AND RETRIEVAL OF DIGITAL MAP DATA BASED UPON A TESSELLATED GEOID SYSTEM, filed Dec. 14, 1988 now U.S. Pat. No. 4,899,293, issued Feb. 6, 1990;

(5) assignee's copending patent application, Ser. No. 07/307,354, GENERIC INTERPOLATION PIPELINE PROCESSOR now U.S. Pat. No. 5,020,014, issued May 28, 1991;

(6) assignee's copending patent application, Ser. No. 07/419,722 PARALLEL POLYGON/PIXEL RENDERING ENGINE ARCHITECTURE COMPUTER GRAPHICS, filed Oct. 11, 1989 now abandoned in favor of continuing application, Ser. No. 07/732,725 filed Jul. 18, 1991;

(7) assignee's copending patent application U.S. patent application Ser. No. 07/514,724 filed on Apr. 26, 1990 entitled POLYGON TILING ENGINE; and (8) assignee's copending patent application U.S. patent application Ser. No. 07/514,742 filed on Apr. 26, 1990 entitled THREE DIMENSIONAL COMPUTER GRAPHIC SYMBOL GENERATOR.

BACKGROUND OF THE INVENTION

Images used in computer graphics are comprised of many small polygons of various shapes and sizes. The algorithm to sort a polygon using digital techniques is well known. However, it is generally performed in software on a microprocessor. For real time applications, that is, situations where the display must be updated 20 times a second or more, the current state of the art is too slow. This is due to the fact that prior art devices depend primarily on software techniques and do not incorporate a viable hardware approach.

The present invention overcomes the disadvantages of the prior art by implementing a polygon sort algorithm in electronic hardware, thereby allowing a much faster polygon sort speed. It also pipelines the polygon data so that a new polygon can be loaded into the hardware at the same time it is being sorted and simultaneously as a sorted polygon is being output to a graphics rendering engine. The invention also provides an apparatus which implements a polygon sort algorithm using a method wherein the polygon sort engine is never idle.

SUMMARY OF THE INVENTION

Figure 1:
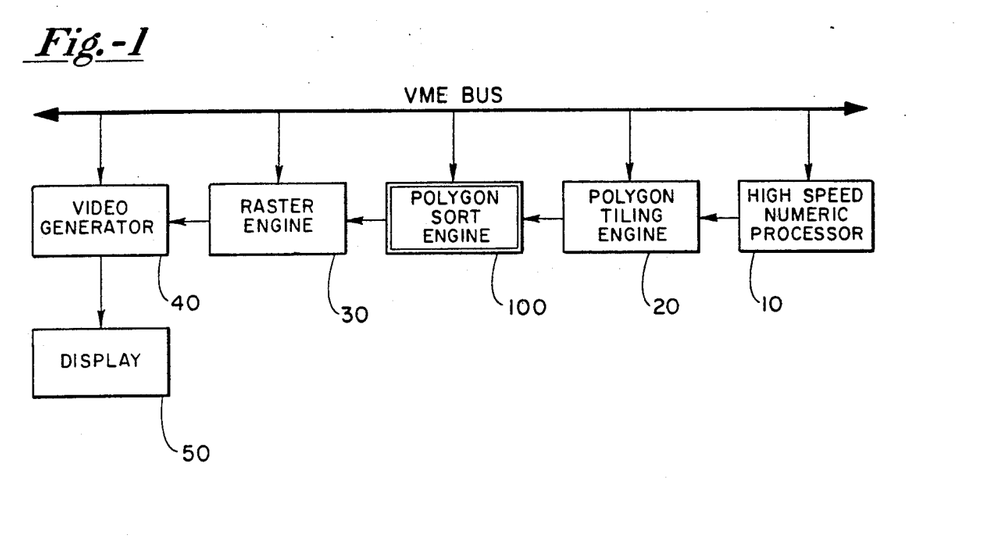
FIG. 1 shows a block diagram overview of a digital data pipeline as used in a digital map system, including a polygon sort engine made in accordance with the present invention.

FIG. 1 shows a block diagram of the major components of a high speed graphics display system. These include a means for display 50, video generator means 40, raster engine means 30, polygon sort engine means 100, polygon tiling engine means (PTE) 20 and a high speed numeric processor 10. The polygon sort engine (PSE) 100 fits architecturally between the raster engine and the polygon tiling engine. The PSE is designed to receive polygon vertex points from the polygon tiling engine and correctly load these vertex points into the raster engine. The raster engine, in combination with the video generator renders three dimensional raster graphics on the video display 50.

The invention provides a polygon sort engine apparatus including a means for filtering vertices, a PING-/PONG RAM means for storing and providing access to vertex data, a means for counting the number of vertices, a means for providing a min/max pointer circuitry, and a means for generating the left and right sides of the polygon correctly to the next stage of the pipeline. In one embodiment of the invention, a polygon sort engine includes first and second means for sorting. The first means for sorting receives planar, externally convex polygon vertex points from an external polygon tiling engine. This includes points and lines. The state machine on the second means for sorting interfaces with the polygon tiling engine and provides a control signal which determines when the first means for sorting will receive the next polygon. The second means for sorting also controls whether the polygon is stored in the PING or PONG memory. For example, as the state machine means is controlling the sorting of the current polygon into the PING RAM, the state machine will also be controlling the loading of the previous polygon vertices in the PONG RAM into the next stage of the pipeline.

It is one object of the invention to provide a polygon sort engine capable of sorting polygons having any number of vertices.

It is yet another object of the invention to provide a polygon sort engine which can be implemented in a standard cell configuration in a single integrated circuit chip.

It is yet another object of the invention to provide a polygon sort engine which is much faster than performing the same computer algorithm in software on a microprocessor.

It is yet another object of the invention to provide a polygon sort engine which functions with an entire three dimensional graphics pipeline on a three or four circuit board set.

Other objects, features and advantages of the invention will become apparent through the drawings, claims and description of the preferred embodiment herein. In the drawings, like numerals refer to like elements.

DESCRIPTION OF THE PREFERRED EMBODIMENT

Figure 2:
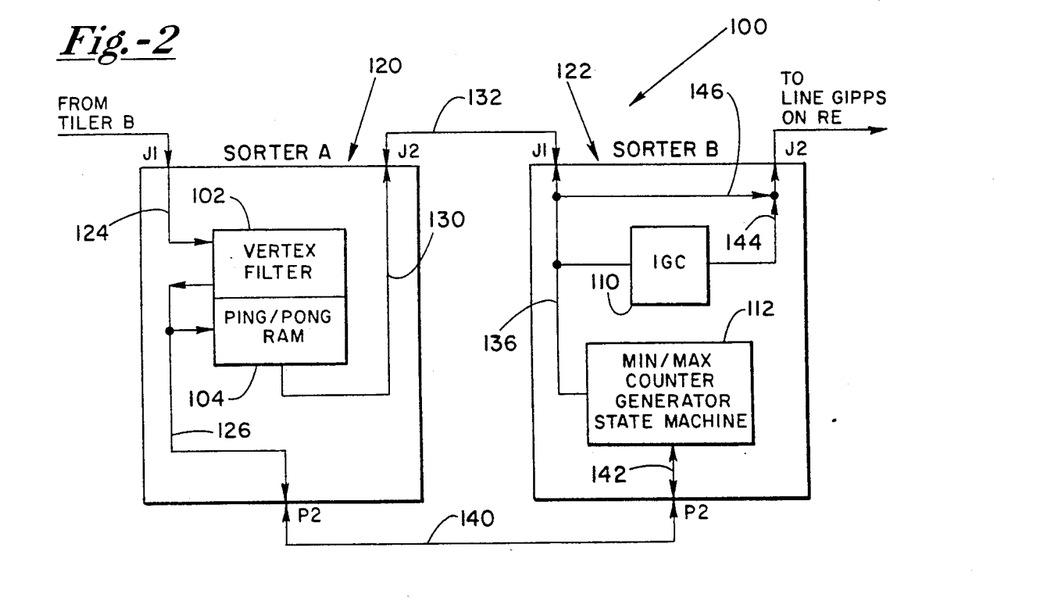
FIG. 2 shows a block diagram of a polygon sort engine made in accordance with the present invention.

Referring now to FIG. 2, a block diagram of a polygon sort engine 100 made in accordance with the teachings of the present invention is shown. The sort engine includes a vertex filter means 102, a PING/PONG RAM 104, an inter-GIPP controller means 110 (IGC) and electronics 112 including a min/max counter, generator state machine 112, an edge generator and a vertex counter. In the embodiment shown in FIG. 2, the polygon sort engine 100 is architecturally organized into first and second portions 120 and 122, respectively. These first and second portions are also referred to herein as SORTER A and SORTER B. In this embodiment of the GIPP, SORTER A includes vertex filter 102 and PING/PONG RAM means 104. SORTER B includes IGC 110 and electronics 112. SORTER A and SORTER B may advantageously comprise individual printed circuit boards or, may be implemented into a single integrated circuit chip using standard cell technology.

SORTER A receives planar, externally convex polygon vertex points from an external polygon tiler engine at input J1 on conductor 124. Conductor 124 may advantageously comprise a digital data bus capable of handling, for example, up to 67 data bits. The vertex filter 102 is further connected to the PING/PONG RAM 104 and input-output port P2 by bus 126. The PING/PONG RAM is coupled to input-output port J2 by bus 130. Data is passed from SORTER A to SORTER B by data bus 132 from input J2 of SORTER A to input J1 of SORTER B. Input-output port J1 of SORTER B is connected to IGC 110 and electronics 112 by conductors 136. SORTER A input-output port P2 is connected by conductors 140 to SORTER B input-output port P2. Electronics 112 are further connected by conductors 142 to SORTER B input-output port P2. Conductors 144 couple IGC means 110 to input-out port J1 of SORTER B. SORTER B input-output ports J2 and J1 are further connected by conductors 146.

SORTER A DESCRIPTION

Vertex Filter Overview: The incoming polygon vertices must first pass through the vertex filter means 102 before being stored in PING/PONG RAM 104. The vertex filter deletes any consecutive vertices that have the same address. The vertex that is closer to the viewer in Z depth is retained. Consecutive vertex points at the same address location must be eliminated because the probability exists that the Raster Engine will incorrectly interpolate the polygon. To prevent the Raster Engine from incorrectly interpolating the polygon, selected information is disregarded, namely RGB values. Normally this is not a problem since most polygons have the same RGB values across the entire polygon. But, if a polygon includes different RGB values at each vertex or the vertex is transparent, then the color interpolation across the polygon could render a visually inaccurate polygon. Such anomalies will show up a very small percentage of the time. Proceeding with this knowledge and design, it is possible to suffer a visually inaccurate polygon. However, such inaccurate polygons will occur infrequently for an acceptably small period of the time.

Figure 3:
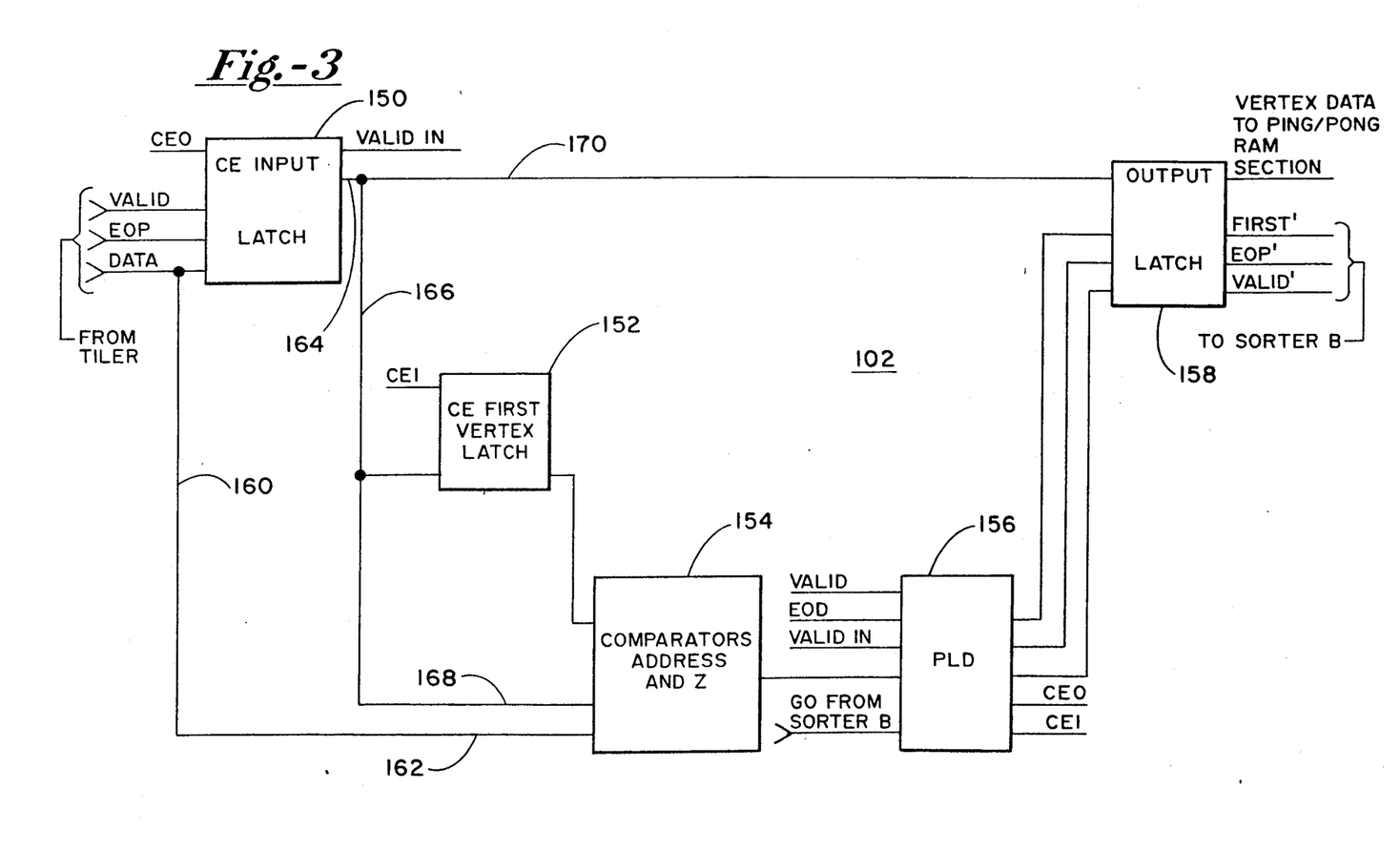
FIG. 3 shows a block diagram of a vertex filter section as provided by the present invention.

Referring now to FIG. 3, a more detailed block diagram of a vertex filter circuit 102 is shown. The vertex filter comprises an input latch 150, a first vertex latch 152, comparator means 154, programmable logic device 156 and output latch 158. Input latch 150 includes a Chip Enable input, a DATA VALID line, an end-of-page line EOP and data inputs labeled DATA. DATA is also connected by conductors 160 to input 162 of comparator 154. Input latch 150 further has a VALID_IN line and an output 164 which is connected by conductors 166 to first vertex latch 152, and a second input 168 of comparator 154. The output 164 of input latch 150 is also connected by conductors 170 to a first input of output latch 158. Vertex filter programmable logic device (PLD) 156 also includes lines for the VALID, EOD and VALID_IN signals, as well as a GO signal from SORTER B. PLD 156 outputs Chip Enable Command CE 0 to input latch 150 and CE 1 to first vertex latch 152.

In operation, the vertex filter 102 is controlled by the GO signal from the state machine on SORTER B which is presented to the PLD. The GO signal enables the vertex filter PLD 156 to begin filtering consecutive vertices at the same address location on the incoming polygon vertex points. The vertex filter can receive vertex points at any starting point in a clockwise or counterclockwise direction around the polygon as long as each vertex is connected to the next vertex. When the vertex filter receives the last vertex it is checked against the first vertex for an address equation. Input latch 158 includes first outputs for vertex data which is presented to the PING/PONG RAM section 104, a second output for signal FIRST', a third input called EOP', and a fourth input called VALID', which are presented to SORTER B.

The input latch 150 receives the vertex DATA, EOP and VALID signal from the PTE and the input latch 150 is enabled by the CE 0 signal from the vertex filter PLD 156. In one example of the invention, the vertex data consists of 24 bits of XY address, 16 bits of Z depth data, 7 bits each of RGB color data and 4 bits of K data. The VALID signal is set low for every vertex point that is a valid vertex in the polygon. The EOP signal is set low for the last vertex in the polygon.

The comparators 154 perform four comparisons whose outputs are used by the vertex filter PLD 156 for controlling the vertex filter 102. The comparators perform an "equals-to" comparison against the incoming vertex's address and the previous vertex's address and against the incoming vertex's address and the first vertex's address. The comparators also perform a less-than comparison against the incoming vertex's Z value and the previous vertex's Z value and against the incoming vertex's Z value and the first vertex's Z value.

The vertex filter PLD 156 is enabled by the GO signal from the state machine in SORTER B which enables the PLD to control the filtering of consecutive vertices with the same XY address. The vertex filter PLD uses the VALID and EOP signals from the PTE along with the VALID_IN signal and comparator outputs to control the input latch and first vertex latch, and provide control signals to the SORTER B board. The CE 1 signal is used to latch the first valid vertex into the first vertex latch 152. The CE 0 signal controls whether or not the incoming vertex is latched into the input latch 150. The FIRST output goes low when the last vertex has the same address as the first vertex and has a Z depth less than the first vertex. The EOP' output goes low when the last vertex in the polygon is processed and is used to signal the state machine on the SORTER B board that the last vertex has been processed.

The VALID output is low for each valid vertex that is output from the output latch. This output is used to control the vertex counter COUNT_ENABLE input on the SORTER B board.

Vertex Filter PLD Equations:

$$CE\ 1 = GO + VALID' + /CNTRL1$$

```
CE 0 = GO + (VALID * VALID_IN)
     + (/VALID_IN * ADDRESS_COLLISION * Z COMPARE */VALID)
     + (/VALID_IN * FIRST_ADDRESS_COLLISION *
     FIRST_Z_COMPARE * /EOP * CNTRL1)
```

$$FIRST = GO + FIRST\ ADDRESS\_COLLISION + FIRST\_Z\_COMPARE + EOP + CNTRL1$$

$$EOP' = GO + EOP + VALID$$

```
VALID' = GO + VALID_in + (ADDRESS_COLLISION */VALID) +
       (FIRST_ADDRESS_COLLLISION * FIRST_Z-COMPARE * /EOP
       * /CNTRL1)
```

Figure 4:
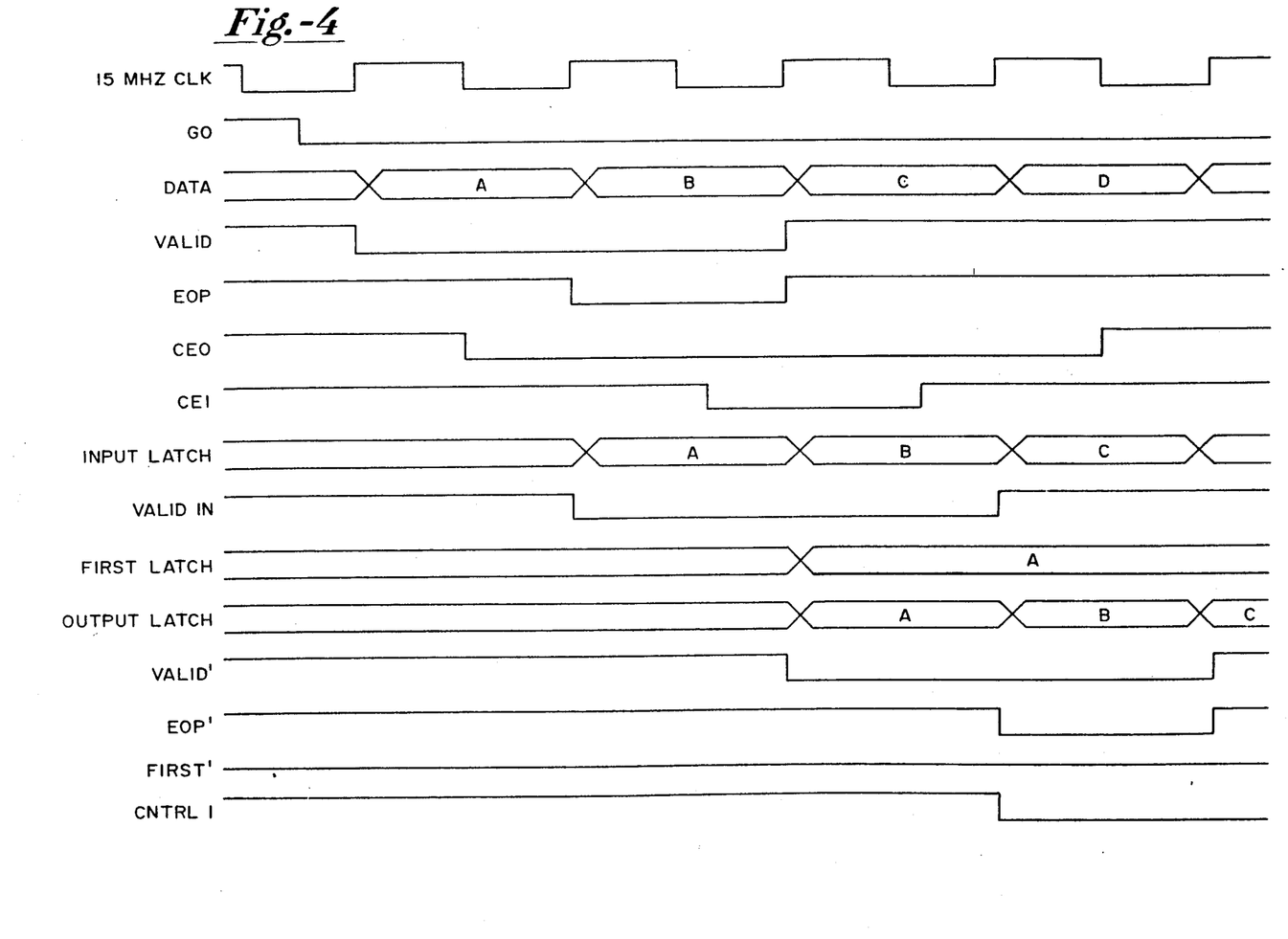
FIG. 4 shows a timing diagram for the vertex filter as provided by the present invention.

CNTRL1 is an internal signal used to avoid a premature first address collision (signified by signal FIRST_ADDRESS_COLLISION) until the vertex point in the first vertex latch is valid. FIG. 4 shows a detailed timing diagram for the vertex filter PLD signals.

Figure 5:
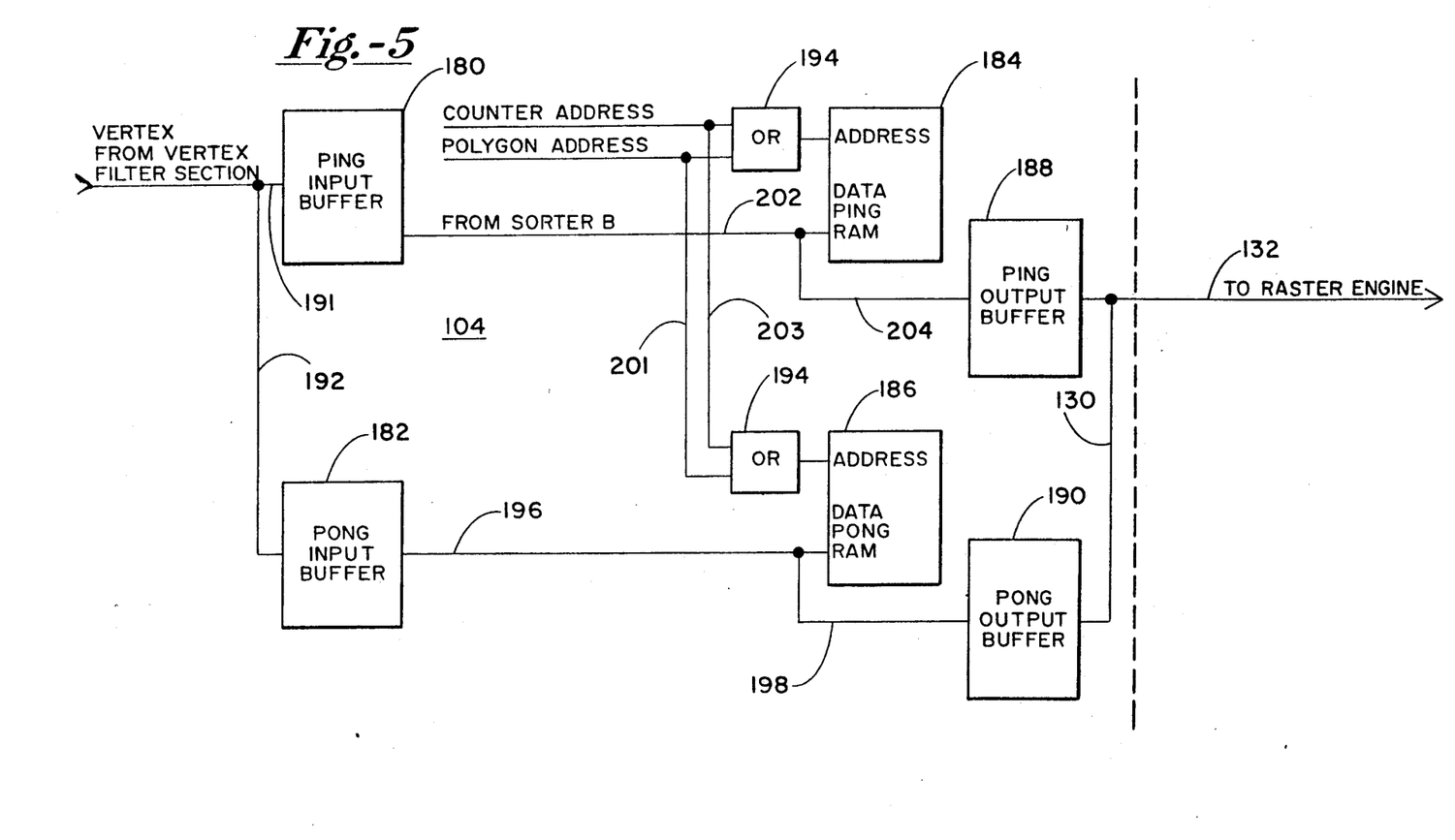
FIG. 5 shows a detailed block diagram of the double buffered memory as employed by one embodiment of the present invention.

Referring now to FIG. 5, a more detailed block diagram of the double buffered PING/PONG RAM memory as employed by one embodiment of the present invention is shown. The PING/PONG RAM memory of this example includes PING input buffer 180, PONG input buffer 182, a first address storage means 184, a second address storage means 186, PING output buffer 188 and PONG output buffer 190.

Vertex data from output latch 158 is presented to the input 191 of PING input buffer 180 and on conductors 192 to the input of PONG input buffer 182. PING input buffer 180 presents the data from SORTER B on conductors 202 to a data input of RAM 184. PONG input buffer 182 presents data on conductors 196 to the data input of PONG RAM 186. Data is read out of the input-/output ports of RAM 184 and 186 on lines 204 and 198, respectively. Conductors 204 transfer data to PING output buffer 188. Conductors 198 transfer data to PONG output buffer 190. Control lines 201 and 203 are or'd by ORgates 194 into the PING and PONG RAMS at their address inputs. Outputs from the PING output buffer 198 and the PONG output buffer 190 are carried on lines 130 and 132 to the raster engine.

The PING/PONG RAM 104 receives the polygon vertex points on the VERTEX DATA lines and stores them in either the PING or PONG RAM while the state machine 112 controls the loading of the previous polygon vertices from the other RAM into the raster engine. This architecture achieves optimum throughput through the PSE. The PING and PONG control lines from the state machine on the SORTER B board control where the incoming vertices will be stored and control the reading out of the previous polygon. Each polygon is written into the PING/PONG RAM using the COUNTER_ADDRESS from the SORTER B vertex counter circuitry. And each polygon is read out of the PING or PONG RAM using the POLYGON_ADDRESS from the Polygon Generator circuitry on the SORTER B board. In one example embodiment of the invention, the PING/PONG RAM holds up to 512 vertex points with each point being 65 bits wide. The PING/PONG RAM includes, for example, 2K × 8, 25 nsec parts.

The PING/PONG input buffers isolate the data paths of the PING/PONG RAM 104 so that while the incoming polygon is being stored into PING RAM 184, the previous polygon can be read out of PONG and vice versa. The PING control line controls the output enable of the PING input buffer and the PONG control line controls the output enable of the PONG input buffer. These two control lines originate from the state machine on the SORTER B board.

Figure 6:
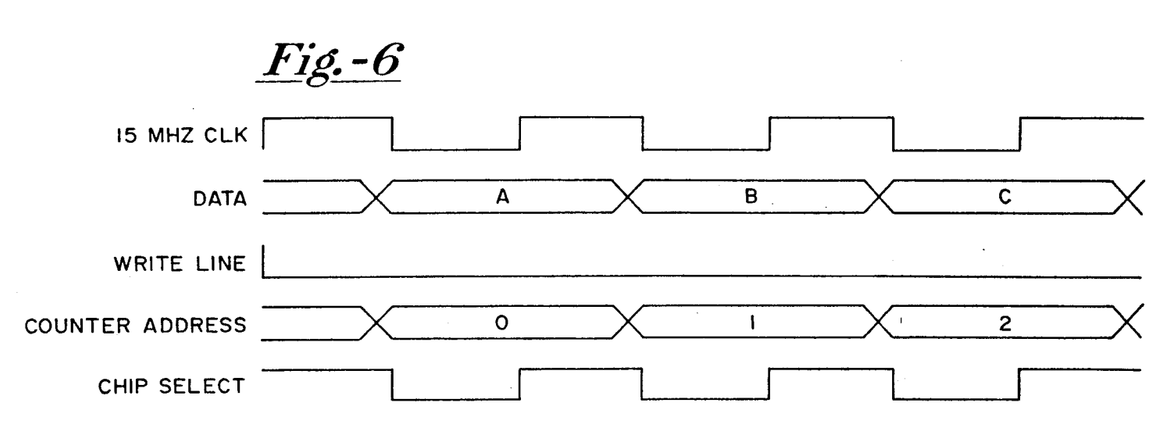
FIGS. 6 and 7 show a RAM cycle timing diagram for the double buffered memory as provided by the present invention.
Figure 7:
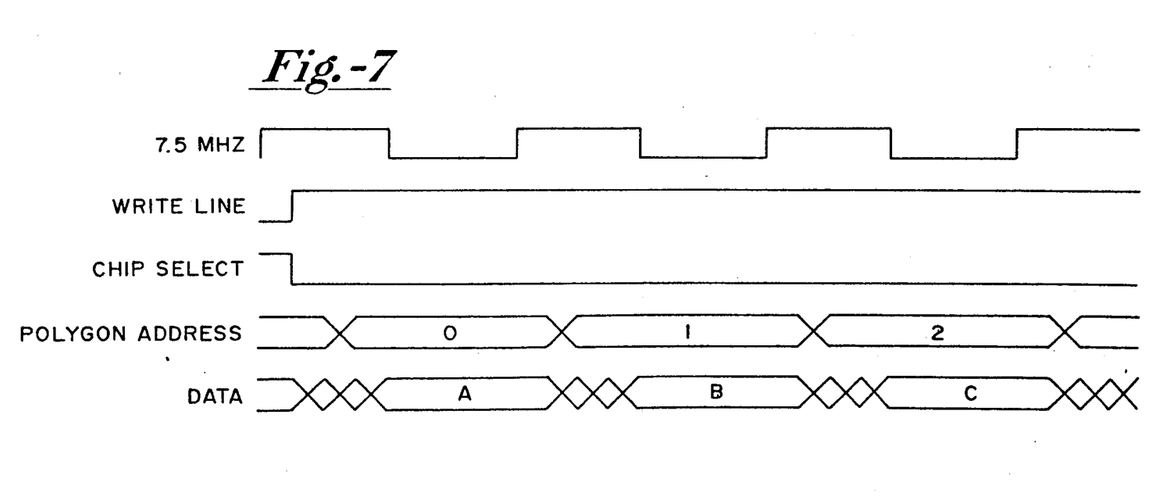

Any one time the PING or PONG RAM is being written into by the COUNTER_ADDRESS or being read out of by the POLYGON_ADDRESS. The PING and PONG control lines determine whether the COUNTER_ADDRESS or POLYGON_ADDRESS is addressing the RAM. The PING/PONG PLD generates the RAM read and write lines. During a read operation, the chip select and output enable lines are low and the write line is high. During a write operation, the write line is low and the chip select and output enable line toggles using, for example, a delayed and inverted 15 MKZ signal. The COUNTER_ADDRESS and incoming vertices are advantageously written into RAM at a 15 MHZ rate. In one embodiment, the edge GIPPs are loaded at half the line GIPP rate so the POLYGON_ADDRESS reads out the polygons into the edge GIPPs at 7.5 MHZ rate. Timing diagrams for RAM cycle timing are shown in FIG. 6 and 7. FIG. 6 details the RAM write cycle timing. FIG. 7 details the RAM read cycle timing.

The PING/PONG output buffers preset the output vertex points to the next board in the pipeline. The PONG control line controls the output enable of the PING output buffer and the PING control line controls the output enable of the PONG output buffer. In one example, SORTER A included the following parts:

| Part | Description | Quantity |
|---|---|---|
| 109 | 5 Volt Regulator | 1 |
| F04 | Inverter | 1 |
| F579 | Counter | 1 |
| ACT74 | Flop | 1 |
| FCT244 | Buffer | 4 |
| FCT521 | Comparator | 6 |
| FCT823B | Buffer | 21 |
| FCT827B | Latch | 32 |
| MC4046 | PLL | 1 |
| AS885 | Comparator | 4 |
| 610 | PLD | 2 |
| 7C128-25 | SRAM | 18 |
| GIPP | Custom | 1 |
| TTLDL025 | Delay Line | 1 |
| F32 | OR Gage | 1 |

Since there are only three control lines that determine the operation and data flow within the SORTER A board it becomes a simple task to control the loading of different polygon types into the PING or PONG RAM, then read out the data to determine correct operation of the vertex filter and RAM. For testing a pattern generator is used to simulate different polygon types including points and lines, with several cases of address collision for each. Generation of the COUNTER_ADDRESS, POLYGON_ADDRESS and the PING and PONG control lines are used to store and then read out the filtered vertices from RAM to determine correct operation.

SORTER B DESCRIPTION

Figure 2A:
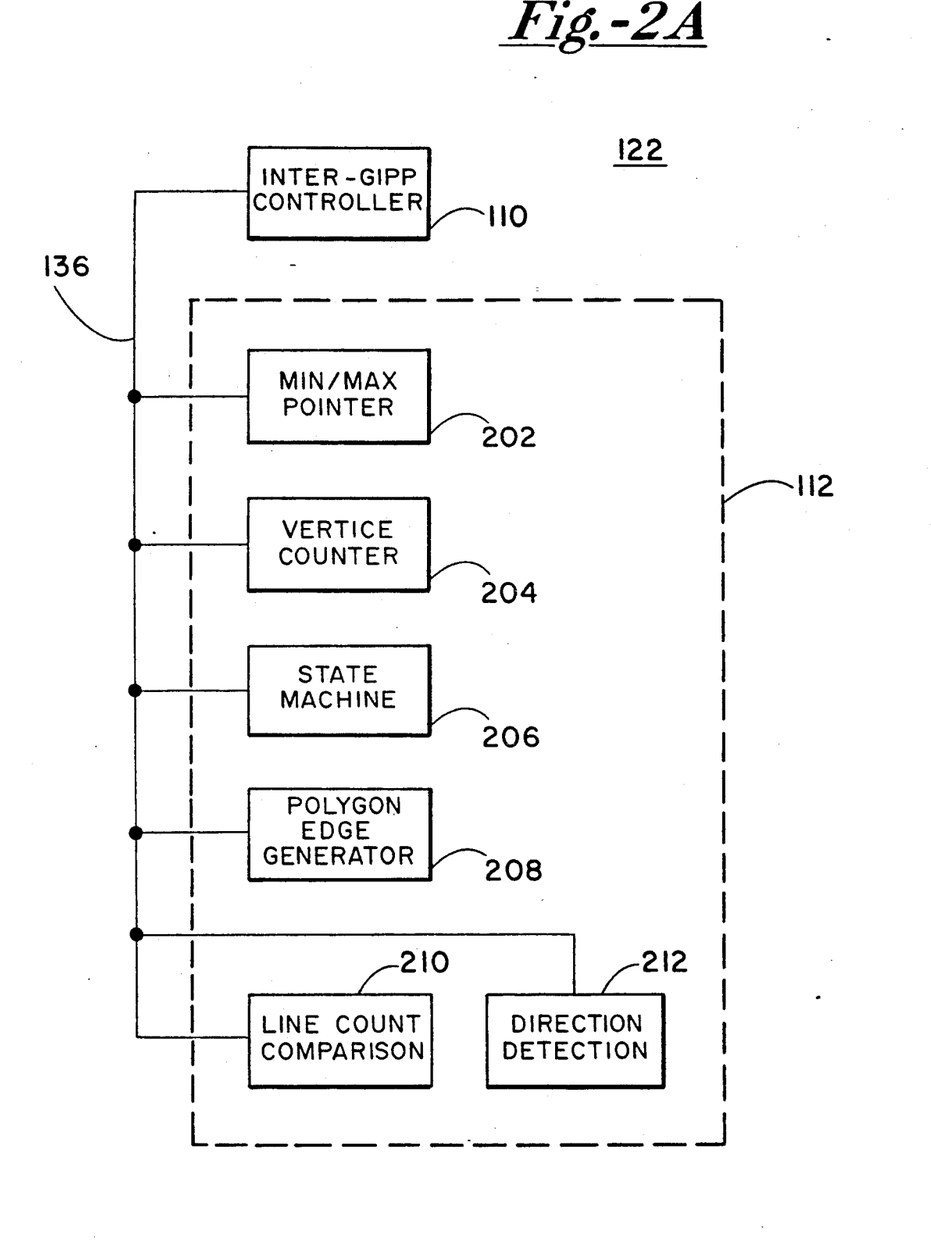
FIG. 2A shows a more detailed block diagram of SORTER B circuitry as employed in one embodiment of the invention.

A more detailed block diagram of SORTER B 122 is shown in FIG. 2A. SORTER B has a three-fold mission. First, it supplies the address to the PING/PONG RAM on Sorter A for storing the incoming polygon vertices in the PING/PONG RAM. Second, it generates the address of the PING/PONG RAM on the SORTER A for reading the vertices out of the PING/PONG RAM and into the edge GIPPs 106 and 108. Third, it supplies the control signals for the proper loading of the polygon vertices into the next board in the pipeline.

In one embodiment SORTER B is implemented on a printed circuit board and includes the following circuitry: min/max pointer circuitry 202, vertex counter 204, polygon edge generator 208, line count comparison circuitry 210, direction detection circuitry 212, state machine 206, and inter-GIPP controller 110.

In operation, the state machine means 112 on SORTER B interfaces with the polygon tiler engine and controls the input of new polygons into SORTER A. The state machine means also controls storing the input polygons in the PING or PONG memories. For example, as the state machine means is controlling the storing of the current polygon into the PING RAM, the state machine will also be controlling the loading of the previous polygon vertices previously stored in the PONG RAM into the next board in the pipeline.

Figure 8:
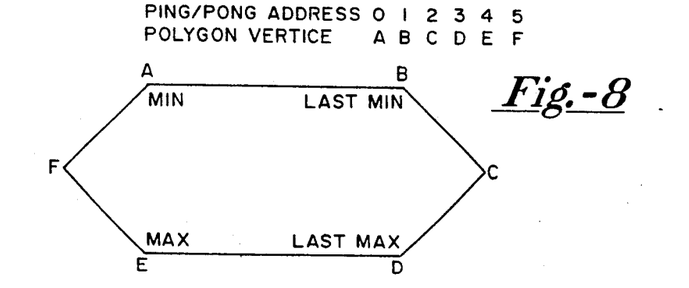
FIG. 8 illustrates schematically a pointer address scheme employed by one embodiment of the present invention.

The min/max pointer circuitry 202 is used to locate the address in the PING/PONG memory in SORTER_A of four distinct points for every polygon stored there. FIG. 8 illustrates schematically the pointer address scheme employed by one embodiment of the invention. The min/max pointer circuitry 202 is used to find the PING/PONG address of the vertex points of a polygon with the minimum y - minimum x value, minimum y - maximum x value and the maximum y - minimum x value and maximum y - maximum x value. The address where each of the four points is located in PING/PONG memory is referred to the MIN, LAST_MIN, MAX and LAST_MAX addresses respectively. Some of the address pointers may degenerate to the same value depending upon the shape of the polygon.

Figures 9, 9A:
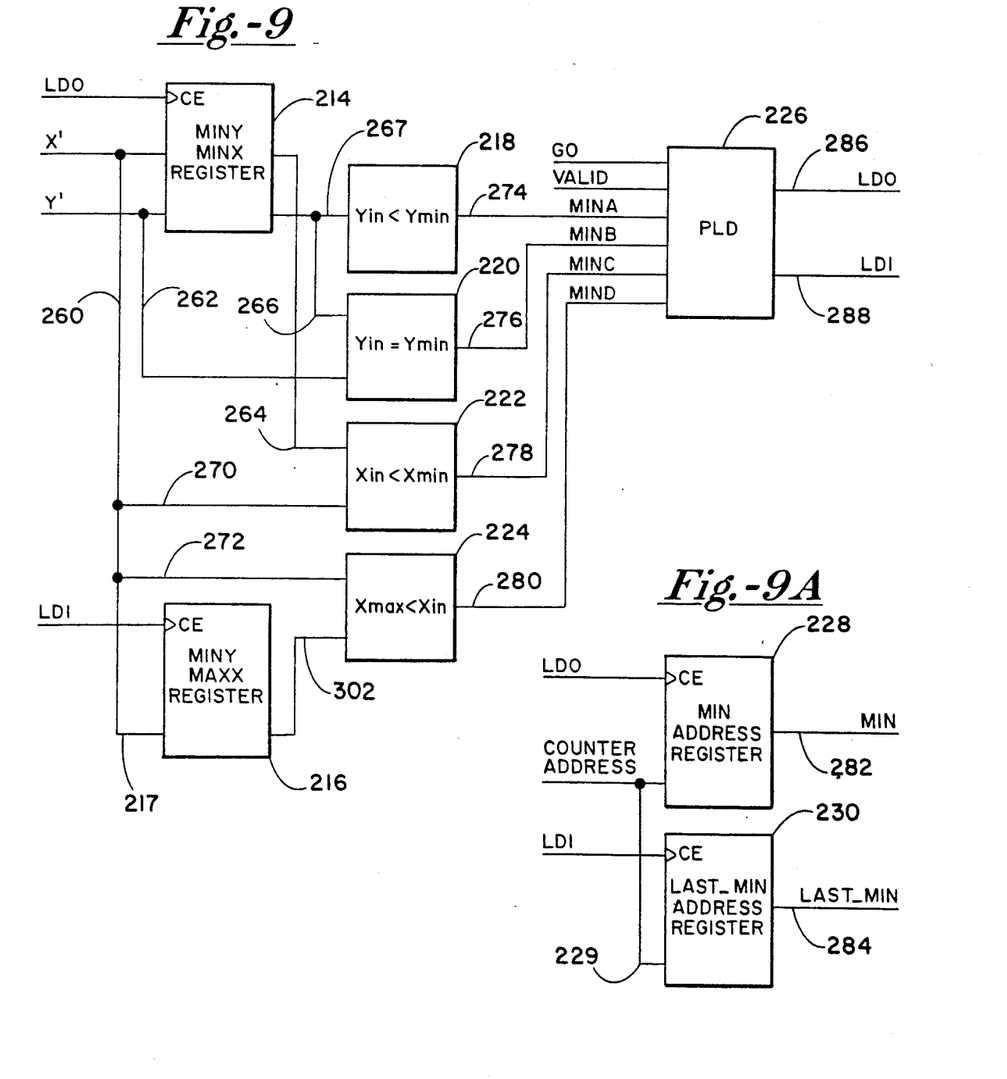
FIGS. 9 and 9A show a detailed block diagram of a minimum pointers circuit as provided by the present invention.

Referring now to FIGS. 9 and 9A, a more detailed block diagram of the minimum pointer circuitry is shown. The major components of the minimum pointer circuitry comprises MINY MINX, register 214, MINY MAXX register 216, first through fourth comparators 218, 220, 222 and 224, programmable logic device 226 and first and second storage registers 228 and 230. MINY MINX register 214 has a chip enable connected to the LD0 signal. Register 214 further includes X' and Y' inputs wherein the X' input is, for example, a 12 bit bus, as is the Y' input. The X' input is further coupled by conductors 260 to comparators 222 and 224 of inputs 270 and 272, respectively. It is further coupled to a first input of MINY MAXX register 216 at input 217. A first output of register 214 is coupled by conductors 264 to a second input of comparator 222. A second output of register 214 is coupled by conductors 266 to a second input of register 220. The MINY MAXX register 216 includes a chip enable input CE coupled to the LD1 signal. The output of MINY MAXX register 216 is coupled to a first input of comparator 224 by conductor 302. The outputs of comparators 218, 220, 222 and 224 are presented to PLD 226 through conductors 274, 276, 278 and 280 as shown. PLD 226 includes output lines 286 and 288 for signals LD0 and LD1. Storage registers 228 and 230 receive the counter address signal on line 229.

The minimum pointer circuitry consists of the following: the MINY MINX register 214, the MINY MAXX register 216, X and Y comparison circuitry 218, 220, 222 and 224, the MIN and LAST_MIN address registers 228 and 230, and the min/max pointer PLD 226. The min/max pointer PLD controls the loading of the MINY MINX registers, the MINY MAXX register and the MIN and LAST_MIN address registers. The outputs from the X and Y comparison circuitry are used by the min/max pointer PLD 226 to determine whether the incoming vertex should replace the values stored in the registers or not.

The min/max pointer PLD 226 stores the first valid vertex in the registers using control signals LD0 and LD1. Again, the MINY MINX register contains the XY address of the vertex in a polygon with the minimum Y and minimum X value and the MIN address register 228 contains the address of where that vertex is located in the PING/PONG RAM. The MINY MAXX register 216 contains the XY address of the vertex in a polygon with the minimum Y and maximum X value and the LAST_MIN address register 230 contains the address of where that vertex is located in the PING/PONG RAM.

The MINA value from the X and Y comparison circuitry detects whether or not the incoming Y value is less than the stored Y value. The MINA and MINB values are used to determine whether or not the incoming Y value is equal to the stored Y value or not. The MINC value detects whether or not the incoming X value is less than the MINX value. The MIND value detects whether or not the MAXX value is less than the incoming X value. After the min/max pointer PLD stores the first valid vertex it uses the outputs from the X and Y comparison circuitry as described above to determine whether or not the incoming vertex should overwrite the vertex already stored according to the following criteria:

```
IF (GO=TRUE) * (VALID=TRUE)
   AND IF Yincoming<Ymin
      LD0=TRUE
      LD1=TRUE
   ELSE IF Yincoming=Ymin
      IF Xincoming<Xmin
         LD0=TRUE
         LD1=FALSE
      If Xincoming>Xmax
         LD0=FALSE
         LD1=TRUE
      ELSE LD0=FALSE
         LD1=FALSE
NOTE:   TRUE MEANS LOAD THE REGISTER
```

Figures 10, 10A, 11:
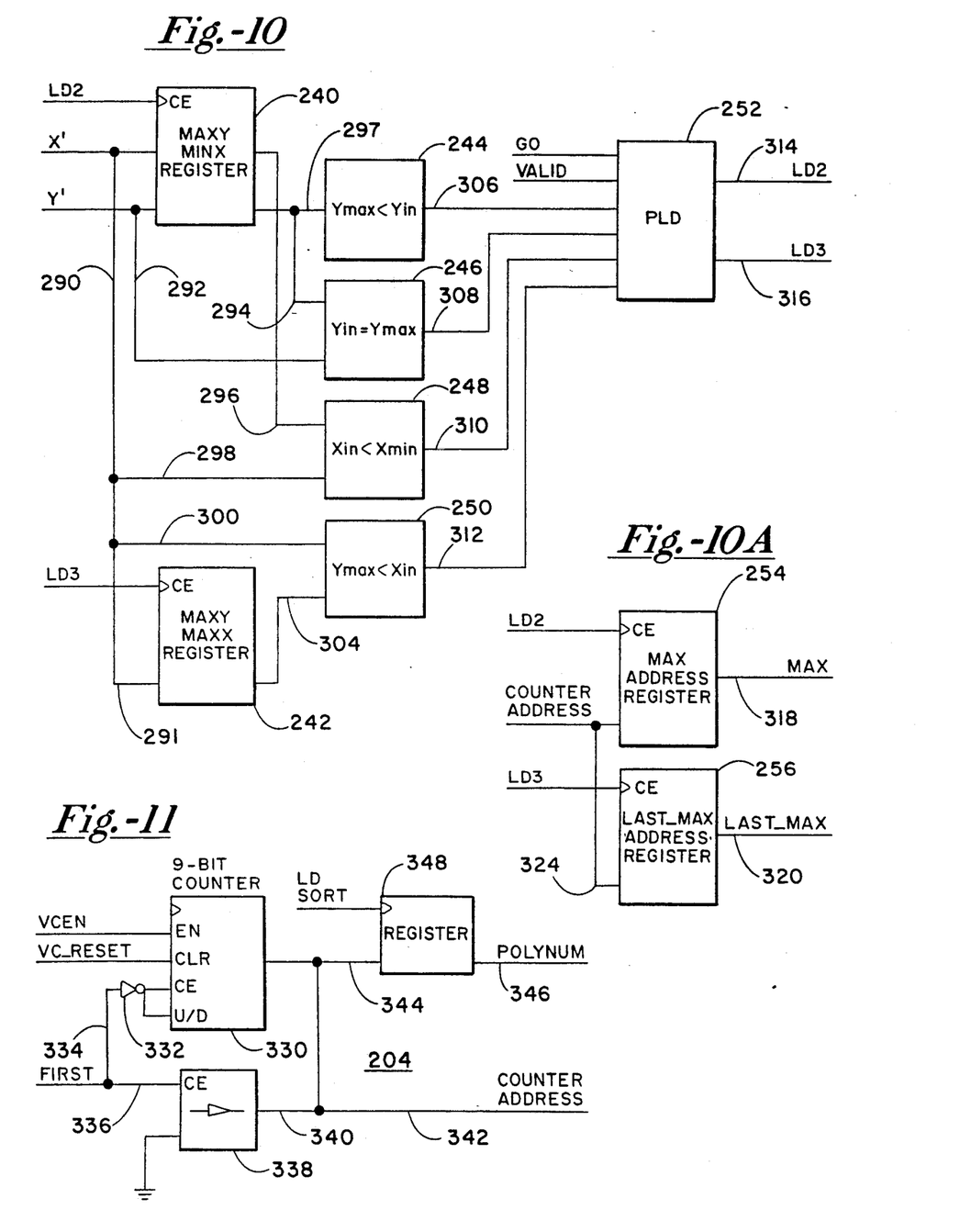
FIGS. 10 and 10A show a detailed block diagram of a maximum pointers circuit as provided by the present invention.
FIG. 11 shows a detailed block diagram of a vertex counter as provided by the present invention.

Referring now to FIGS. 10 and 10A, a more detailed block diagram of the maximum pointer circuitry is shown comprising MAXY MINX register 240, MAXY MAXX register 242, four comparators 244, 246, 248 and 250, PLD 252, MAX register 254, and LAST_MAX register 320. MAXY MINX register 240 includes an X' input which is coupled by line 290 to first inputs of comparators 248 and 250 at inputs 298 and 300. The X' input is also coupled to register 242 at a first input 291. The MAXY MINX register 240 also receives signal LD2 at a chip enable input CE. A Y' input is coupled further to comparator 246 by line 292. The X' and Y' input lines employed in one embodiment of the invention include lines capable of carrying 12 bits of data. A first output of MAXY MINX register 240 at line 296 is connected to a second input of comparator 248. A second output of MAXY MINX is connected by line 297 to comparator 244 and by line 294 to comparator 246. Comparator 244 is connected to a first input of the PLD through conductor 306, comparator 246 is connected at its output by line 308 to a second input of PLD 252, comparator 248 is connected by line 310 to a third input of PLD 252 and comparator 250 as an output connected by line 312 to a fourth input of PLD 252. PLD 252 also has GO and VALID inputs connected to those signals. PLD 252 has a first output 314 for carrying signal LD2 and a second output 316 for carrying output LD3. COUNTER_ADDRESS is introduced into MAX and LAST_MAX registers 254 and 256 on line 324. In one example embodiment, the MAX register 254 outputs and 8 bit word MAX on line 318 and the LAST_MAX register 256 outputs an 8-bit word for the signal LAST_MAX on line 320. The maximum pointer circuitry consists of circuitry similar to that described in the previous section and works in a similar manner. The min/max pointer PLD uses control signals LD2 and LD3 to load the MAXY MINX and MAXY MAXX registers and the MAX and LAST_MAX address registers. The min/max pointer PLD uses the X and Y comparison circuitry to find the vertex points with the maximum Y-minimum X value and the maximum Y-maximum X value. The MAX and LAST_MAX address register contains the address of where these vertex points are stored in the PING/PONG RAM. These values are latched according to the following criteria:

```
IF (GO=TRUE) * (VALID=TRUE)
   AND IF Yincoming<Ymax
      LD2=TRUE
      LD3=TRUE
   ELSE IF Yincoming=Ymax
      IF Xincoming<Xmin
         LD2=TRUE
         LD3=FALSE
      If Xincoming>Xmax
         LD2=FALSE
         LD3=TRUE
      ELSE LD2=FALSE
         LD3=FALSE
NOTE:   TRUE MEANS LOAD THE REGISTER
```

Referring now to FIG. 11, a more detailed block diagram of a vertex counter 204 as provided by the present invention is shown. The counter includes a 9 bit counter 330, buffer 338, and register 348. Counter 330 includes enable line VCEN coupled to the VCEN signal and a clear line CLR. Register 348 is connected by line 344 to the outputs of counter 330 and buffer 338. Buffer amplifier 338 has a first input at 336 which receives the FIRST signal. The FIRST signal is also coupled by line 334 through inverter 33 to the CE and U/D inputs of counter 330. Counter 330 has a first output coupled to line 344 to register 348 for providing the counter address signal. In one embodiment of the invention, this is preferably an 8 bit signal. The signal VCEN is determined by the following equation:

$$VCEN = GO + VALID\_' + (FIRST\_' * /EOP\_').$$

The vertex counter section has a two fold purpose. The COUNTER ADDRESS signal is generated to write the incoming polygon vertices into the PING/PONG RAM through this section. Secondly, it creates a POLYNUM address at output 346 of register 348 which contains the address location of the last vertex written into PING/PONG RAM. The 9-bit counter 330 is used to create the COUNTER_ADDRESS to the PING/PONG RAM. The counter is reset at the beginning of each polygon by VC_RESET and the address is incremented for each valid vertex by the VCEN control signal from the min/max PLD. The VCEN signal stops incrementing the counters when EOP is detected except when FIRST is detected. Then the count direction is reversed to countdown one address, when FIRST is detected and the last vertex is going to overwrite the first vertex so the address of the last vertex will be one less than what the counters indicate.

Figure 12:
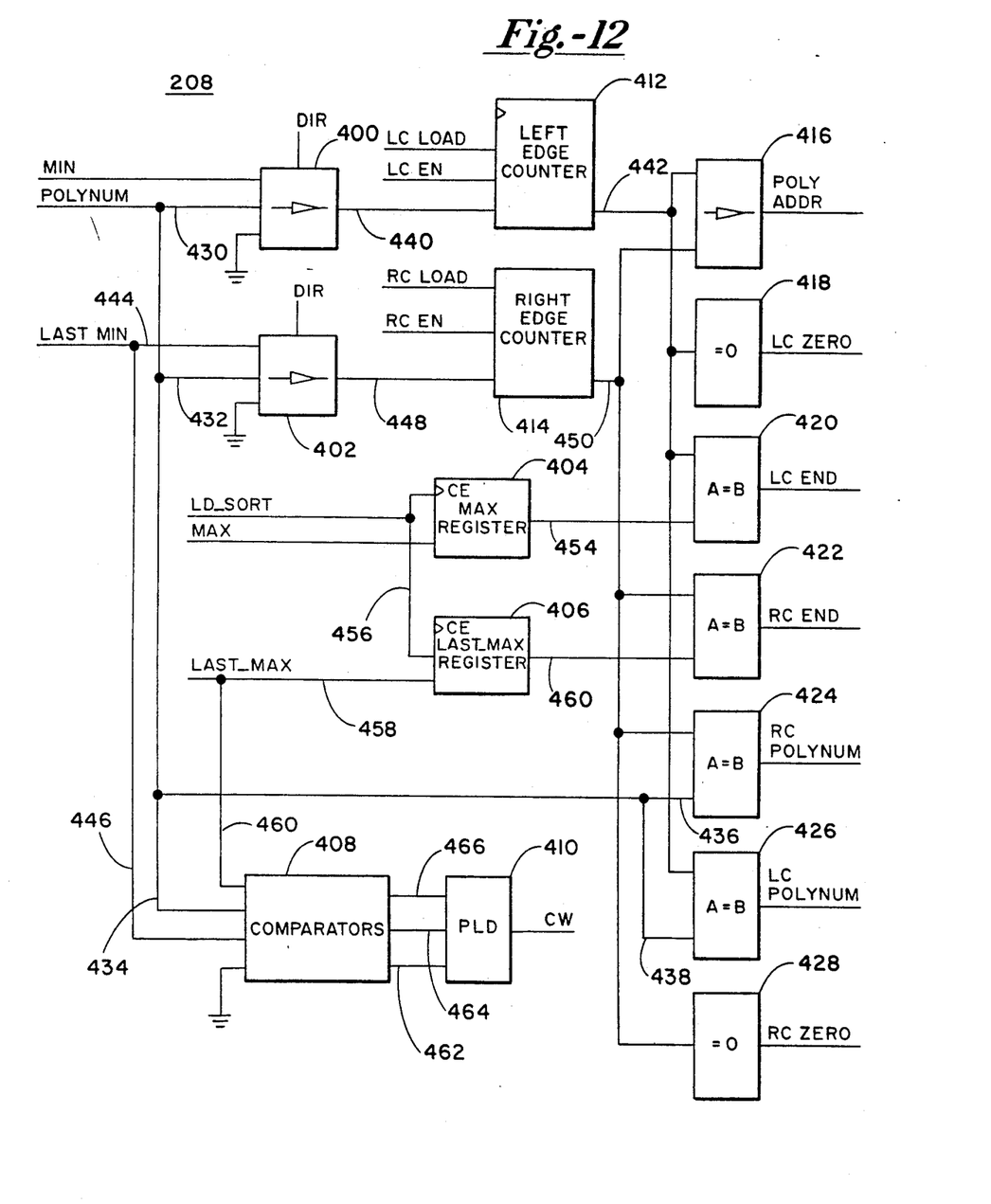
FIG. 12 shows a detailed block diagram of a polygon edge generator as provided by the present invention.

Referring now to FIG. 12, a more detailed block diagram of the polygon edge generator 208 is shown. The edge generator comprises, input buffers 400 and 402, MAX register 404, LAST_MAX register 406, comparators 408, PLD 410, left counter 412, right counter 414, output buffer 416, and comparators 418, 420, 422, 424, 426 and 428. Buffers 400 and 402 are coupled to a control signal DIR. Buffer 400 has a first input coupled to signal MIN and a second input coupled at 430 to POLYNUM which is also coupled to a first input 432 of buffer 402 and further still coupled to a first input through line 434 at comparators 408 and first inputs of comparators 424 and 426 through lines 436 and 438, respectively. Buffer 400 also has an output coupled by line 440 to a first input of left edge counter 412. Left edge counter 412 includes input lines connected separately to a first signal LC_LOAD and LC_ENABLE. Left counter 412 has an output 442 coupled to an input of buffer 416, an input of comparator 418, an input of comparator 420 and a second input of comparator 426. Buffer 402 has a first input coupled by conductor 444 to the signal LAST_MIN which is further coupled by conductor 446 to a second input of comparator 408. Buffer 402 has an output coupled by line 448 to right counter 414. Right counter 414 further has first and second inputs connected separately to signals RC_LOAD and RC_EN. Right counter 414 further has an output 450 coupled to a first input of buffer 416, a first input of comparator 422, a second input of comparator 424, and an input of comparator 428. Register 404 includes an input tied to the LD_SORT signal and the MAX signal. It further has an output at line 454 which is coupled to a second input of register 420. Register 406 is coupled through conductor 456 to signal LD_SORT and coupled at a second input to LAST_MAX at line 458. The LAST_MAX signal is also connected by line 460 to a third input of comparators 408. Register 406 has an output coupled by line 460 to a second input of register 422. Comparators 408 have outputs 462, 464 and 466 coupled to first, second and third inputs of PLD 410. PLD 410 generates an output signal CW.

The Polygon Edge Generator creates the nine-bit POLY_ADD address used to read the polygon vertices out of the PING/PONG memory. The sorter state machine controls the loading of the left and right edge counters, the count direction and the inputs and outputs of the counters.

The left and right edge counters 412, 414 create addresses of vertex points along the left and right edges of the polygon stored in the PING/PONG RAM. The left edge counter 412 can be preloaded with the MIN address, the POLYNUM address or zero. The right edge counter can be preloaded with the LAST_MIN address, the POLYNUM address or zero. The count direction is controlled by DIR and DIR*. The POLY_ADDR output is controlled by LR_OE.

The left and right edge counter outputs are also fed to the line count comparison circuitry where the current POLY_ADDR of the left and right counters are compared to the MAX address, LAST_MAX address, the POLYNUM address and zero. These comparator outputs are used by the PSE state machine to determine the next POLY_ADDR value. LC_ZERO and RC_ZERO detect when the left and right counters are equal to zero. LC_POLYNUM and RC_POLYNUM detect when the left and right counters are equal to the POLYNUM address. LC_END detects when the left counter has reached the MAX address and RC_END detects when the right counter has reached the LAST_MAX address. LC_END is also used to detect a horizontal line and POINT is used to detect a point.

The direction detection circuitry is used to detect whether a polygon was stored into RAM in the clockwise or counterclockwise direction. The PSE state machine needs to know this in order to correctly address the polygon in the PING/PONG RAM into the edge GIPPs. Clockwise direction is determined by the following equation implemented in the DIRDET PLD:

$$CW = (LAST\_MIN < LAST\_MAX)*$$
$$(LAST\_MIN = ZERO + LAST\_MAX = POLYNUM) +$$
$$(/LAST\_MIN = POLYNUM*/LAST\_MAX = ZERO).$$

Figure 13:
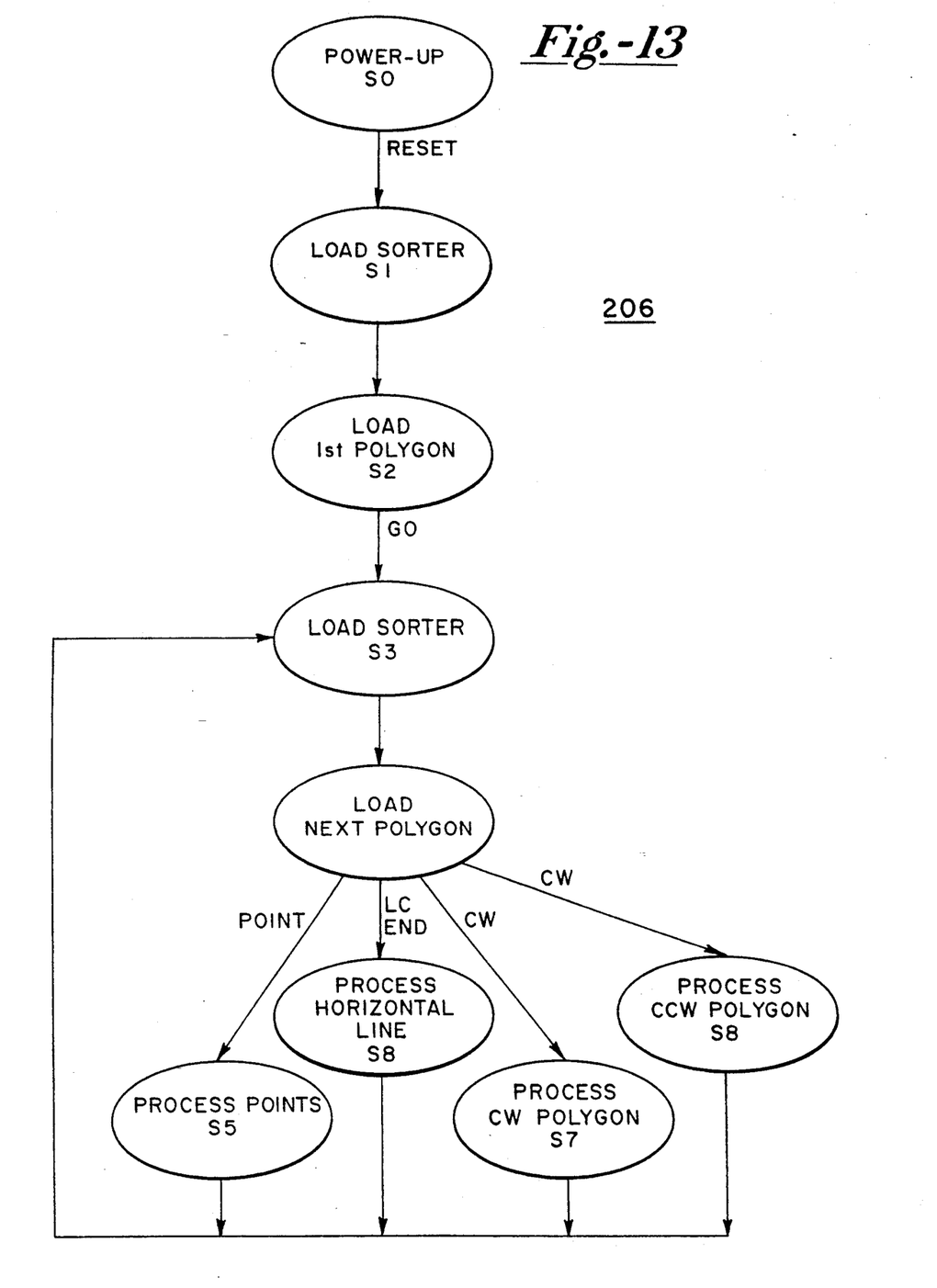
FIG. 13 schematically illustrates the state machine algorithm of one embodiment of the present invention.

The state machine 206 is responsible for the correct loading of the polygon vertices into the pipeline. The state machine determines if the polygon to be processed is a point, horizontal line, clockwise polygon or counterclockwise polygon. From there the state machine can control the polygon edge generator to address the vertices in the PING/PONG RAM.

In one embodiment of the invention, the state machine is implemented in a stand-alone-microsequencer (SAM) from Altera Company. The SAM controls the polygon edge generator address by stepping through a program based on various inputs. The SAM used in this particular embodiment of the invention has only eight inputs so several inputs are multiplied into the SAM depending upon what state the SAM is in.

The SAM program consists of several parts. At power-up or when reset by FRAME_SYNC the SAM issues LD_SORT to reset the GO signal to the PTE to begin loading the first polygon. When finished, the SAM issues LD_SORT again which resets the GO signal to the Tiler to begin loading the next polygon and at the same time the PING/PONG control signal is toggled. The SAM then makes a decision as to whether the polygon is a point, horizontal line, clockwise or counterclockwise polygon. The SAM then begins addressing the correct vertices from PING/PONG RAM.

When finished loading the polygon the SAM checks the GO signal to see if the incoming polygon has been loaded into PING/PONG. If the PTE isn't finished loading the polygon then the SAM waits, if the PTE is finished then the SAM issues an LD_SORT signal to begin processing the next polygon and resetting the GO signal to allow the PTE to load the next polygon.

Inputs

LC_POLYNUM, RC_POLYNUM, LC_ZERO, RC_ZERO, LC_END, RC_END, CW, POINT: all from the polygon edge generator section used by the SAM program to make decisions when loading a polygon into the Edge GIPPs.

GO: from the Inter-Gipp controller to signal the SAM when the Tiler has finished loading a polygon.

Outputs

LR_OE, RC_EN, LC_EN, RC_LOAD, LC_LOAD, LR_INPUT: used to control the polygon edge generator counters inputs and outputs.

DIR, DIR*: used to control the count direction of the left and right counters in the polygon edge generator.

LD_SORT: is issued at the beginning of the processing of each polygon. This signal toggles the PING- /PONG control lines, resets GO and latches the POLYNUM<MAX and LAST_MAX address and the CW signal.

Inter-GIPP And Sorter Controller Overview

This PLD supplies the following control signals:

EOP_PRIME is used to set the GO signal high when the Tiler finishes loading a polygon. And LD_SORT is used to reset the GO signal low at the beginning of a new polygon.

LD_SORT toggles the PING/PONG control lines at the start of a new polygon.

GIPP_RST* is a three cycle long active low signal used to reset the edge GIPPs, line GIPPs and SAM.

Tiler/Sorter Interface Timing

Figure 14:
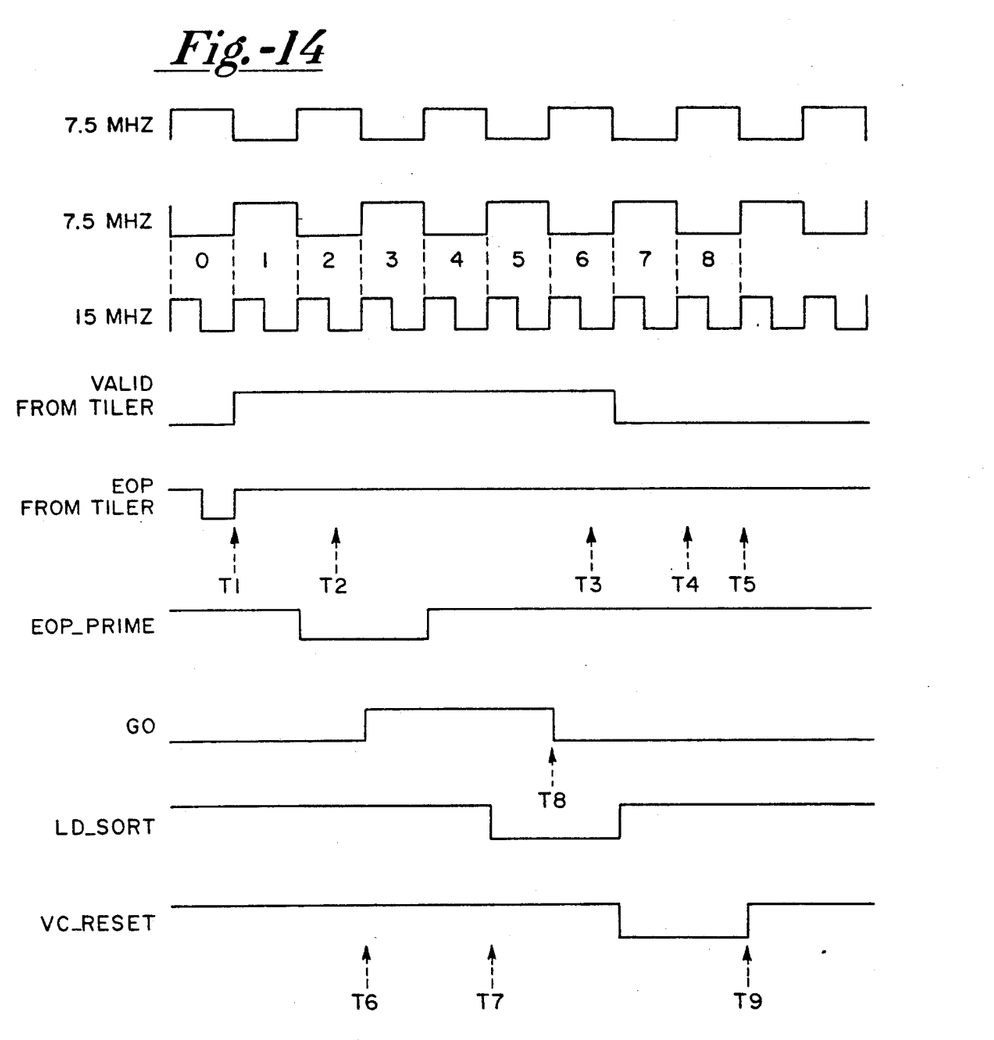
FIG. 14 shows a timing diagram for the interface between the polygon tiler engine and the polygon sorter engine.

Referring now to FIG. 14, a timing diagram for the interface between the PTE and PSE is shown. The VALID and EOP signals from the PTE are deasserted together and the EOP signal is no more than two cycles long. The PTE can check the GO signal to see if the Sorter is ready to accept the next polygon no sooner than the sixth clock cycle after the last polygon. And the VALID signal cannot be asserted sooner than the seventh clock cycle.

Still referring to FIG. 14, note that in the waveform marked EOP FROM TILER, point T1 marks the point in time at which CE 0 is active and EOP enters SORTER A. Point T2 marks the time at which CE 1 is active and EOP leaves SORTER A. Point T3 marks the point in time at which the PTE can look for GO to be low on the sixth cycle after the last vertex point on the previous polygon and issue the next valid vertex on the seventh cycle. At point T4 CE 0 is active and at point T5, CE 1 is active. At point T8, GO is reset low by LD_SHORT. At point T6, GO is set high by EOP'. At point T7, the SAM detects GO HIGH and issues LD_SORT. At point T9, the vertex counter is reset to 0 and is ready to load an incoming polygon into PING-/PONG RAM.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A polygon sort engine for sorting a polygon comprising a plurality of vertices received from a source of vertices wherein each vertex of the plurality of received vertices comprises an X coordinate, a Y coordinate, and a Z coordinate, and wherein the polygon includes a MIN vertex, a LAST MIN vertex, a LAST MAX vertex and a MAX vertex wherein the MIN vertex comprises a minimum Y and minimum X coordinate, the LAST MIN vertex comprises a minimum Y and maximum X coordinate, the MAX vertex comprises a maximum Y and minimum X coordinate and the LAST MAX vertex comprises a maximum Y and maximum X coordinate, the polygon sort engine comprising:

(a) means operably connected to the source of vertices for filtering the plurality of received vertices of the polygon, said filtering means having a vertex data output for providing filtered vertex data;

(b) pointer means for determining addresses, said pointer means comprising logic means connected to receive from the source of vertices the X and Y vertex coordinates of the received vertices, said logic means comparing the X and Y vertex coordinates to determine the MIN vertex, the LAST MIN vertex, the LAST MAX vertex and the MAX vertex and providing a plurality of control signals, each control signal corresponding to a different one of the MIN vertex, the LAST MIN vertex, the LAST MAX vertex and the MAX vertex, said pointer means further comprising first address means for storing an address corresponding to the MIN vertex, second address means for storing an address corresponding to the LAST MIN vertex, third address means for storing an address corresponding to the LAST MAX vertex and fourth address means for storing an address corresponding to the MAX vertex wherein said first, second, third and fourth address means store the addresses in response to the corresponding control signals and wherein each said first, second, third and fourth address means has an address output;

(c) edge generation means connected to said address output of the first, second, third and fourth address means for receiving from said address output the MIN vertex address, LAST MIN address, LAST MAX address and MAX address, said edge generation means generating therefrom addresses of vertex points along the edges of the polygon by counting addresses bounded by the MIN vertex address, LAST MIN address, LAST MAX address and MAX address, said edge generation means having a polygon address output;

(d) a PING input buffer having an input and an output, said input being coupled to said vertex data output of said filtering means to receive and store filtered vertex data;

(e) a PONG input buffer having an input and an output, said input being coupled to said output of said filtering means to receive and store filtered vertex data;

(f) PING RAM means for storing vertex data having a bus coupled to said output of said PING input buffer, said PING RAM means having a read address input connected to said polygon address output; and (g) PONG RAM means for storing vertex data having a bus coupled to said output of said PONG input buffer, said PONG RAM means having a read address input connected to said polygon address output of said edge generation means, whereby said PING RAM means and said PONG RAM means read out filtered vertex data corresponding to the addresses of vertex points along the edges of the polygon generated by said edge generation means.

2. The invention of claim 1 wherein said filtering means further comprises:

(a) an input latch having an input for receiving the plurality of received vertices, said input latch having an output;

(b) a first vertex latch coupled to said output of said input latch for storing a first vertex of the polygon, said first vertex latch having a first vertex latch output;

(c) a plurality of comparators coupled to the source of received vertices to receive the plurality of received vertices, coupled to said output of said first vertex latch for receiving the first vertex therefrom, and coupled to said output of said input latch, said plurality of comparators operating to compare the Z coordinates of consecutive vertices with equal X and Y coordinates, said plurality of comparators comprising a comparator output for providing a first signal when X and Y coordinates of consecutive vertices are equal, and a second signal indicating the lesser Z coordinate when consecutive vertices have equal X and Y coordinates;

(d) a programmable logic device having an input coupled to said comparator output for receiving the first and second signals, the programmable logic device providing first and second chip enable commands to said input latch and said first vertex latch, respectively, to allow said first vertex latch to store the first vertex of the defined polygon, to allow said input latch to store an incoming vertex and to provide a VALID signal output when the incoming vertex has a valid Z value wherein the Z value is defined as valid when it is a lesser Z coordinate for consecutive vertices having equal X and Y coordinates; and (e) an output latch for providing the filtered vertex data, said output latch coupled to said VALID signal output of said programmable logic device and said input latch output, said output latch comprising an output coupled to storing means and operating responsively to the VALID signal to only pass a selected one of consecutive vertices having equal X and Y coordinates wherein the selected one has lesser Z coordinates.

3. The invention of claim 2 further comprising:

(a) a PING output buffer having an input coupled to said bus of said PING RAM means; and (b) a PONG output buffer having an input coupled to said bus of said PONG RAM means, wherein said PING output buffer and said PONG output buffer read out filtered vertex data corresponding to the addresses generated by the edge generation means from said PING RAM and said PONG RAM means.

* * * * *